US009124210B2

(12) United States Patent
Yamamoto

(10) Patent No.: US 9,124,210 B2
(45) Date of Patent: Sep. 1, 2015

(54) MOTOR CONTROL APPARATUS WITH POWER FAILURE DETERMINATION UNIT

(71) Applicant: FANUC CORPORATION, Minamitsuru-gun, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/250,773

(22) Filed: Apr. 11, 2014

(65) Prior Publication Data
US 2014/0306640 A1 Oct. 16, 2014

(30) Foreign Application Priority Data
Apr. 15, 2013 (JP) ................................ 2013-084984

(51) Int. Cl.
| H02P 1/00 | (2006.01) |
| H02P 1/28 | (2006.01) |
| H02P 3/00 | (2006.01) |
| H02P 27/08 | (2006.01) |
| H02P 29/02 | (2006.01) |
| H02P 3/14 | (2006.01) |
| H02P 27/06 | (2006.01) |

(52) U.S. Cl.
CPC .............. H02P 27/08 (2013.01); H02P 29/025 (2013.01); H02P 3/14 (2013.01); H02P 27/06 (2013.01)

(58) Field of Classification Search
CPC ...... B26B 19/00; H02M 5/4585; H02P 27/06; H02P 3/14
USPC .................................................. 318/504, 376
See application file for complete search history.

(56) References Cited

U.S. PATENT DOCUMENTS

| 4,729,082 A * | 3/1988 | Sato ................................ 363/41 |
| 6,204,627 B1 * | 3/2001 | Watanabe et al. ............. 318/729 |
| 2013/0134910 A1 * | 5/2013 | Iwashita et al. ............... 318/376 |
| 2014/0176025 A1 * | 6/2014 | Mao et al. ...................... 318/376 |
| 2015/0054443 A1 * | 2/2015 | Swamy ......................... 318/504 |

FOREIGN PATENT DOCUMENTS

| CN | 102804589 A | 11/2012 |
| JP | 6-205586 A | 7/1994 |
| JP | 07-322626 A | 12/1995 |
| JP | 9-163752 A | 6/1997 |
| JP | 11-69846 A | 3/1999 |
| JP | 2006-014546 A | 1/2006 |
| JP | 2009-044781 A | 2/2009 |

* cited by examiner

Primary Examiner — Erick Glass
(74) Attorney, Agent, or Firm — Lowe Hauptman & Ham, LLP

(57) ABSTRACT

A motor control apparatus includes: a PWM rectifier; an inverter; a detection unit for detecting an AC voltage value of the PWM rectifier; a calculation unit for calculating a power supply voltage phase; a detection unit for detecting an AC current value of the PWM rectifier; a current loop control unit for generating an AC voltage command to control a power conversion operation of the PWM rectifier; a current loop saturation state determination unit for determining to be in a current loop saturation state when a magnitude of the AC voltage command is equal to or larger than a predetermined voltage prescribed value; an operation determination unit for determining whether the PWM rectifier is in a powering operation or in a regenerative operation and a power failure determination unit for determining a presence or absence of a power failure at the AC power supply side from the determination results.

6 Claims, 9 Drawing Sheets

CURRENT VECTOR
ON THREE-PHASE
COORDINATE

CURRENT VECTOR
ON TWO-PHASE
COORDINATE

THREE-PHASE
TO TWO-PHASE
CONVERSION

US 9,124,210 B2

MOTOR CONTROL APPARATUS WITH POWER FAILURE DETERMINATION UNIT

RELATED APPLICATIONS

The present application claims priority to Japanese Application Number 2013-084984, filed Apr. 15, 2013, the disclosure of which is hereby incorporated by reference herein in its entirety.

BACKGROUND OF THE INVENTION

1. Field of the Invention

The present invention relates to a motor control apparatus in which AC power supplied from an AC power supply side is converted to DC power to be output, and then the converted DC power is further converted to AC power for driving a motor in order to supply the power to the motor. More particularly, the invention relates to the motor control apparatus with a power failure determination unit for determining presence or absence of a power failure at the AC power supply side.

2. Description of the Related Art

In a motor control apparatus for driving motors used in machine tools, forming machines, injection molding machines, industrial machines, or various kinds of robots, DC power temporarily converted from AC power which is input from an AC power supply side is further converted to AC power. The converted AC power is used as drive power for a motor provided for each of drive axis. The motor control apparatus includes: a rectifier for outputting DC power by rectifying AC power supplied from an AC power supply side provided with a three-phase AC input power supply; and an inverter, being connected to a DC link at a DC side of the rectifier, for performing a bidirectional power conversion between DC power at the DC link and AC power being drive power for a motor or regenerative power. The motor control apparatus controls the speed, torque, or position of a rotor of the motor connected to the AC side of the inverter.

In such a motor control apparatus, when an input power supply voltage decreases due to power failure at an AC power supply side of a rectifier, it is difficult to continue a normal operation of the motor. Therefore, faults such as damage and deformation may occur to: the motor; a motor control apparatus for driving the motor; a tool connected to the motor driven by the motor control apparatus; a processing target to be processed by the tool; a manufacturing line with the motor control apparatus; and the like. Therefore, with a power failure determination unit being provided at an AC power supply side of the rectifier and with a presence or absence of a power failure of the AC power supply side of the rectifier being monitored, it is necessary that the motor control apparatus operates to perform a protective operation in order to avoid or minimize the faults described above, when the power failure determination unit determines that a power failure has occurred at the AC power supply side of the rectifier.

As a power failure determination method, there is a method of calculating an amplitude value of a power supply voltage by coordinate conversion of a three-phase AC input voltage at an AC power supply side of a rectifier to a voltage vector equivalent thereto on a two-phase coordinate and calculating an amplitude value of the vector; and then detecting a power failure when a state in which the calculated amplitude value is less than a predetermined reference voltage value has continued for a predetermined reference period, as described in Japanese Laid-open Patent Publication No. 2006-14546, for example. FIG. 9 is a diagram illustrating a power failure detection method in an invention described in Japanese Laid-open Patent Publication No. 2006-14546. AC voltage detection unit 111 detects an AC voltage at a side to which three-phase AC input power supply 3 of a rectifier 100 constituting a motor control apparatus is connected and a voltage amplitude calculation unit 112 calculates a voltage amplitude value thereof. A power failure determination unit 113 determines that a power failure has occurred at the AC power supply side of the rectifier 100 when a state in which the amplitude value calculated by the voltage amplitude calculation unit 112 is less than a predetermined reference voltage value has continued for a predetermined reference period.

Furthermore, in recent years, a rectifier using pulse width modulation (PMW) (hereinafter, referred to as the "PMW rectifier") has been widely utilized as a rectifier in a motor control apparatus due to a request for reducing power supply harmonics and reactive power. The PWM rectifier is configured as a bridge circuit of semiconductor switching elements, and performs a power conversion operation to convert input AC power to DC power to output the converted DC power, by controlling a switching operation of the semiconductor switching elements by a switching command.

For example, as described in Japanese Laid-open Patent Publication No. H7-322626, in a motor control apparatus with a PWM rectifier, there is a method for determining that a power failure has occurred when the apparatus detects that a PWM frequency component is included in a signal, a level of which changing in accordance with the polarity of a power supply voltage, and which includes the same frequency component as the power supply frequency.

Furthermore, for example, as described in Japanese Laid-open Patent Publication No. 2009-44781, there is a method for detecting a power failure when an absolute value of a voltage command value in a motor control apparatus being equal to or less than a power failure detection level.

However, in a case that a PWM rectifier is applied to a rectifier described in Japanese Laid-open Patent Publication No. 2006-14546, a power failure at an AC power supply side may not be detected in the method described above during a regenerative operation in which a DC output voltage does not decrease since the DC output voltage appears as an input voltage through the rectifier circuit, when a power failure has occurred at the AC power supply side of the PWM rectifier which is an open state. FIG. 10 is a diagram illustrating a power failure detection at an AC power supply side of a PWM rectifier during a regenerative operation in which a DC output voltage does not decrease, in a motor control apparatus with a conventional PWM rectifier and an inverter. Since an on-off control of switching elements is always performed in a PWM rectifier 200, a DC voltage appears at an AC voltage detection unit 211 through switching elements which is in an on state as illustrated in FIG. 10 when an AC power supply side of the PWM rectifier 200 becomes an open state during an occurrence of a power failure. When the PWM rectifier 200 is in a powering operation in which AC power is converted to DC power, a power failure determination unit 213 can perform a power failure detection by a voltage amplitude because a DC voltage output from the PWM rectifier 200 decreases, an AC voltage detected by the AC voltage detection unit 211 also decreases, and therefore a voltage amplitude value calculated by a voltage amplitude calculation unit 212 decreases, although there are some delays in detection. However, when the PWM rectifier 200 is in a regenerative operation in which DC power is converted to AC power, the power failure determination unit 213 may not detect a power failure at the AC power supply side of the PWM rectifier 200 because a DC voltage increases due to regenerative energy from a motor (not illustrated), an AC voltage detected by the AC voltage detection unit 211 also increases, and a voltage amplitude value calculated by the voltage amplitude calculation unit 212 increases.

In addition, according to an invention described in Japanese Laid-open Patent Publication No. H7-322626, in a signal having the same frequency component as a power supply frequency used for determining a power failure occurrence, a PWM frequency component is less likely to appear due to LC filters generally provided at an AC power supply side of a PWM rectifier. Therefore, there is a drawback that a power failure can be stably detected only when there are no LC filters.

Furthermore, according to an invention described in Japanese Laid-open Patent Publication No. 2009-44781, it is not possible to detect a power failure when a power failure occurs during a regenerative operation since there is no possibility that a voltage command value decreases.

BRIEF SUMMARY OF THE INVENTION

In view of the above problems, an object of the present invention is to provide a motor control apparatus capable of detecting a power failure in which an AC power supply side of a PWM rectifier becomes an open state in a regenerative operation state.

To achieve the object described above, a motor control apparatus includes: a PWM rectifier for performing a bidirectional power conversion between AC power at an power supply side and DC power at a DC link being on a DC side; an inverter for performing a bidirectional power conversion between DC power at the DC link and AC power being drive power for a motor or regenerative power, the inverter being connected to the DC link; an AC voltage detection unit for detecting an AC voltage value at the AC power supply side of the PWM rectifier; a phase calculation unit for calculating a power supply voltage phase from the AC voltage value; an AC current detection unit for detecting an AC current value at the AC power supply side of the PWM rectifier; a current loop control unit for generating an AC voltage command to control a power conversion operation of the PWM rectifier based on an error between an input current command and the AC current value and the power supply voltage phase; a current loop saturation state determination unit for determining to be in a current loop saturation state when a magnitude of the AC voltage command is equal to or larger than a predetermined voltage prescribed value; an operation determination unit for determining whether the PWM rectifier is in a powering operation state in which AC power is converted to DC power or in a regenerative operation state in which DC power is converted to AC power; and a power failure determination unit for determining a presence or absence of a power failure at the AC power supply side of the PWM rectifier by using determination results of the operation determination unit and the current loop saturation state determination unit.

According to a first aspect, the power failure determination unit determines that a power failure has occurred at the AC power supply side of the PWM rectifier by using a first requirement that the operation determination unit determines to be in the regenerative operation state and a second requirement that the current loop saturation state determination unit determines to be in the current loop saturation state.

In a second aspect, the motor control apparatus according to the first aspect described above further includes: a DC voltage detection unit for detecting a DC voltage value at the DC link; a voltage loop control unit for generating a current command to be input to the current loop control unit based on an error between an input DC voltage command and the DC voltage value; and a voltage loop saturation state determination unit for determining to be in a voltage loop saturation state when a magnitude of the current command is equal to or larger than a predetermined current prescribed value. The power failure determination unit determines that a power failure has occurred at the AC power supply side of the PWM rectifier by using the first requirement described above, the second requirement described above, and a third requirement that the voltage loop saturation state determination unit determines to be in the voltage loop saturation state.

In a third aspect, the motor control apparatus according to the first aspect described above further includes a current amplitude calculation unit for calculating a current amplitude value from the AC current value. The power failure determination unit determines that a power failure has occurred at the AC power supply side of the PWM rectifier by using the first requirement described above, the second requirement described above, and a fourth requirement that the current amplitude value is equal to or less than a predetermined amplitude value.

In a fourth aspect, the motor control apparatus according to the second aspect described above further includes a current amplitude calculation unit for calculating a current amplitude value from the AC current value. The power failure determination unit determines that a power failure has occurred at the AC power supply side of the PWM rectifier by using the first requirement described above, the second requirement described above, the third requirement described above, and a fourth requirement that the current amplitude value is equal to or less than a predetermined amplitude value.

In a fifth aspect, the motor control apparatus according to the first to fourth aspects described above further includes a voltage amplitude calculation unit for calculating a voltage amplitude value from the AC voltage value detected by the voltage amplitude detection unit. The power failure determination unit determines that a power failure has occurred at the AC power supply side of the PWM rectifier also when the voltage amplitude value is equal to or less than a predetermined amplitude value.

BRIEF DESCRIPTION OF THE DRAWINGS

The present invention will be understood more clearly by reference to the accompanying drawings in which.

DETAILED DESCRIPTION OF THE INVENTION

A motor control apparatus with a power failure determination unit is now explained with reference to drawings. However, it should be understood that the present invention is not limited to the drawings or embodiments described in the following.

Figure 1:
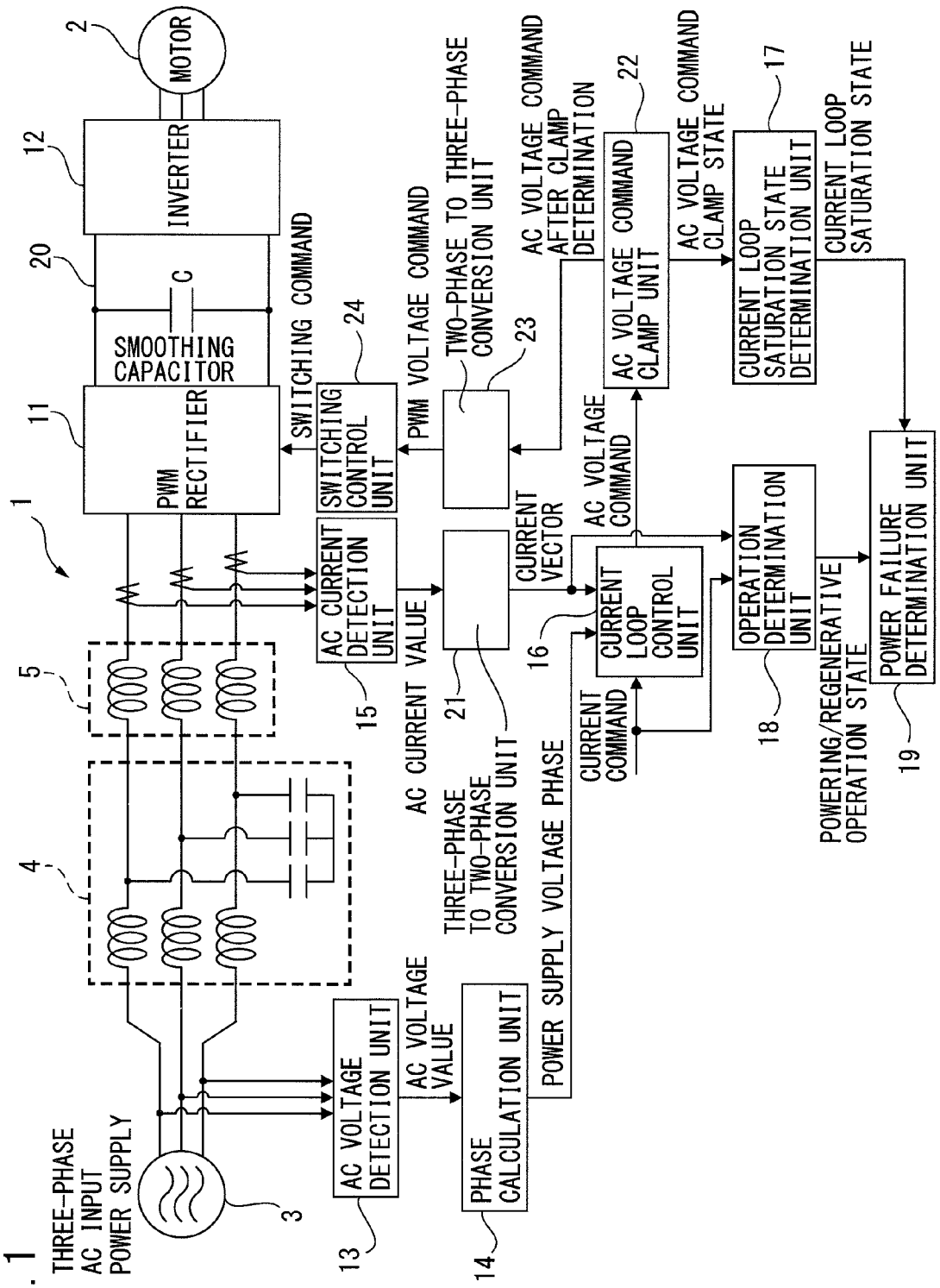
FIG. 1 is a principle block diagram illustrating a motor control apparatus according to a first embodiment.

FIG. 1 is a principle block diagram illustrating a motor control apparatus according to a first embodiment. Hereinafter, components with the same reference numerals in different drawings denote those having the same function.

According to a first embodiment, a motor control apparatus 1 includes a PWM rectifier 11, an inverter 12, an AC voltage detection unit 13, a phase calculation unit 14, an AC current detection unit 15, a current loop control unit 16, a current loop saturation state determination unit 17, an operation determination unit 18, and a power failure determination unit 19.

The PWM rectifier 11 is configured as a bridge circuit of semiconductor switching elements and performs a bidirectional power conversion between AC power at an AC power supply side provided with a commercial three-phase AC power supply 3 and DC power at a DC link being a DC side. LC filters 4 and AC reactors 5 are connected to the AC power supply side of the PWM rectifier 11.

The PWM rectifier 11 and the inverter 12 are connected through a DC link 20. The inverter 12 is configured as a conversion circuit with switching elements such as, for example, a PWM inverter therein. Note that when the motor control apparatus 1 performs a drive control of a plurality of motors 2, an inverter 12 is provided for each motor 2. The inverter 12 performs a bidirectional power conversion between DC power at the DC link 20 and AC power being drive power for the motor 2 or regenerative power. The motor 2 operates based on three-phase AC power with variable voltage and variable frequency supplied from the inverter 12. Furthermore, regenerative power generated during braking of the motor 2 is returned to the DC link 20 through the inverter 12.

The AC voltage detection unit 13 detects an AC voltage value at the AC power supply side of the PWM rectifier 11. The AC voltage value detected by the AC voltage detection unit 13 is transmitted to the phase calculation unit 14.

The phase calculation unit 14 calculates a power supply voltage phase from the AC voltage value. The power supply voltage phase calculated by the phase calculation unit 14 is transmitted to the current loop control unit 16.

The AC current detection unit 15 detects an AC current value at the AC power supply side of the PWM rectifier 11. The AC current value detected by the AC current detection unit 15 is transmitted to a three-phase to two-phase conversion unit 21.

Figure 2:
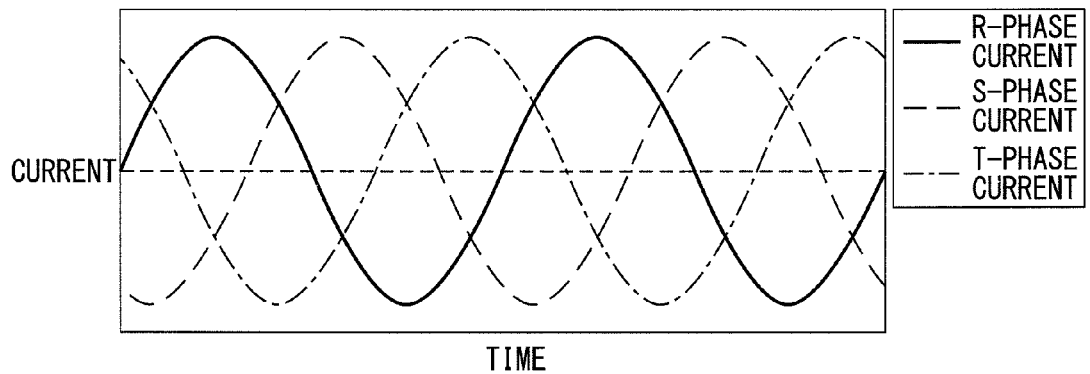
FIG. 2 is a diagram illustrating an example of a three-phase AC current.
Figure 3A:
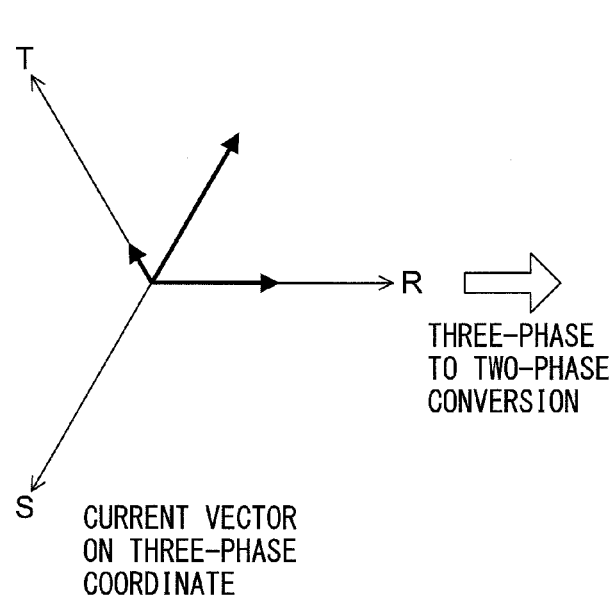
FIG. 3A and FIG. 3B are diagrams illustrating a three-phase to two-phase conversion.
Figure 3B:
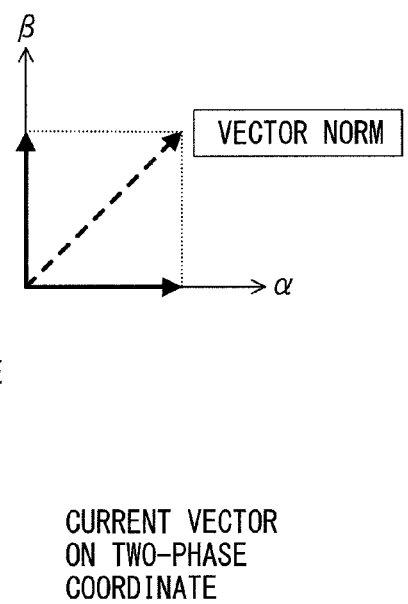

The three-phase to two-phase conversion unit 21 converts the AC current value on a three-phase coordinate detected by the AC current detection unit 15 to a current vector on a two-phase coordinate through a three-phase to two-phase conversion. FIG. 2 is a diagram illustrating an example of a three-phase AC current and FIGS. 3A and 3B are diagrams illustrating a three-phase to two-phase conversion. An RST three-phase AC current as depicted in FIG. 2 is represented by a current vector on a three-phase coordinate as depicted in FIG. 3A. A three-phase to two-phase conversion on the current vector on the three-phase coordinate results in a current vector on the two-phase coordinate as depicted in FIG. 3B.

Note that a three-phase AC voltage can be similarly converted to a voltage vector on a two-phase coordinate.

The current loop control unit 16 generates an AC voltage command to control the power conversion operation of the PWM rectifier 11 based on an error between an input current command and the AC current value and the power supply voltage phase.

An AC voltage command clamp unit 22 first calculates a magnitude of the AC voltage command generated by the current loop control unit 16. As a magnitude of the AC voltage command, a vector norm on the two-phase coordinate as depicted in FIG. 3B is calculated, for example. Although an upper limit value of the magnitude of the AC voltage command is generally determined according to rated currents of semiconductor switching elements and the like in the PWM rectifier 11, the AC voltage command clamp unit 22 clamps the AC voltage command generated by the current loop control unit 16 at an upper limit value when the magnitude of the calculated AC voltage command is equal to or larger than the upper limit value. The clamped AC voltage command is transmitted to a two-phase to three-phase conversion unit 23. Hereinafter, the AC voltage command transmitted to the two-phase to three-phase conversion unit 23 from the AC voltage command clamp unit 22 is referred to as the "AC voltage command after clamp determination". In addition, when the AC voltage command is clamped by the AC voltage command clamp unit 22, the current loop saturation state determination unit 17 is notified of that effect. Note that when the magnitude of the AC voltage command calculated by the AC voltage command clamp unit 22 is less than the upper limit value, the AC voltage command generated by the current loop control unit 16 is transmitted as is to the two-phase to three-phase conversion unit 23 as the "AC voltage command after clamp determination".

The two-phase to three-phase conversion unit 23 converts the AC voltage command after clamp determination on the two-phase coordinate received from the AC voltage command clamp unit 22 to a PWM voltage command on the three-phase coordinate through a two-phase to three-phase conversion to transmit to a switching control unit 24. The two-phase to three-phase conversion is a reverse conversion of the three-phase to two-phase conversion described with reference to FIGS. 3A and 3B.

The switching control unit 24 generates a switching command for controlling switching operations of the semiconductor switching elements in the PWM rectifier 11 by comparing the PWM voltage command with a triangular wave carrier signal of a predetermined carrier frequency. As a result, in the PWM rectifier, the switching operations of the semiconductor switching elements therein are controlled by the switching command and the bidirectional power conversion is performed between AC power at the AC power supply side and DC power at the DC link being the DC side.

As described above, when the AC voltage command is clamped by the AC voltage command clamp unit 22, the current loop saturation state determination unit 17 is notified of that effect. A state in which the AC voltage command is clamped is referred to as the "current loop saturation state". The current loop saturation state determination unit 17 determines to be in the current loop saturation state and notifies the power failure determination unit 19 of that effect when the AC voltage command is clamped by the AC voltage command clamp unit 22, i.e., when the magnitude of the AC voltage command is equal to or larger than a predetermined upper limit value.

The operation determination unit 18 determines whether the PWM rectifier 11 is in a powering operation state in which AC power is converted to DC power or in a regenerative operation state in which DC power is converted to AC power. A determination whether it is in the powering operation state or in the regenerative operation state is performed, for example, by using a polarity of a d-phase current obtained by further performing a dq conversion on the current vector which is obtained by the three-phase to two-phase conversion unit 21 performing the three-phase to two-phase conversion on the AC current value detected by the AC current detection unit 15. When the d-phase current of the AC current value in a direction flowing into the PWM rectifier 11 from the AC power supply side is assumed to be, for example, positive, the operation determination unit 18 determines to be in the powering operation state when the d-phase current is positive, and to be in the regenerative operation state when negative. A determination result by the operation determination unit 18 is notified to the power failure determination unit 19.

The power failure determination unit 19 determines a presence or absence of a power failure at the AC power supply side of the PWM rectifier by using determination results of the current loop saturation state determination unit 17 and the operation determination unit 18.

In the first embodiment, it is determined that a power failure has occurred at the AC power supply side of the PWM rectifier 11, by using a first requirement that the operation determination unit 18 determines to be in the regenerative operation state and a second requirement that the current loop saturation state determination unit 17 determines to be in the current loop saturation state. In other words, the power failure determination unit 19 determines that a power failure has occurred at the AC power supply side of the PWM rectifier 11 when the operation determination unit 18 determines to be in the regenerative operation state (the first requirement) and when the current loop saturation state determination unit 17 determines to be in the current loop saturation state (the second requirement). Since the PWM rectifier is unable to flow current as instructed by the switching command when a power failure has occurred during a regenerative operation, an error between the current command and a current vector which is obtained by performing the three-phase to two-phase conversion on the AC current value by the three-phase to two-phase conversion unit 21 becomes large and the AC voltage command output from the current loop control unit 16 becomes large. When the magnitude of the AC voltage command becomes equal to or larger than the predetermined upper limit value, the AC voltage command generated by the current loop control unit 16 is clamped by the AC voltage command clamp unit 22 as described above and the current loop saturation state determination unit 17 determines to be in the current loop saturation state. Thus, the power failure determination unit 19 in the first embodiment determines that a power failure has occurred at the AC power supply side of the PWM rectifier 11 when the operation determination unit 18 determines to be in the regenerative operation state (the first requirement) and the current loop saturation state determination unit 17 determines to be in the current loop saturation state (the second requirement). In the motor control apparatus including: a PWM rectifier for rectifying AC power supplied from an AC power supply side provided with a three-phase AC input power supply to output DC power; and an inverter, being connected to a DC link at a DC side of the PWM rectifier, for performing a bidirectional power conversion between DC power at the DC link and AC power which is drive power for a motor or regenerative power, by determining that a power failure has occurred at the AC power supply side in a case that the first requirement and the second requirement are met, it is possible to accurately detect the power failure when the power failure has occurred in which the AC power supply side becomes an open state while the PWM rectifier is in the regenerative operation.

Figure 4:
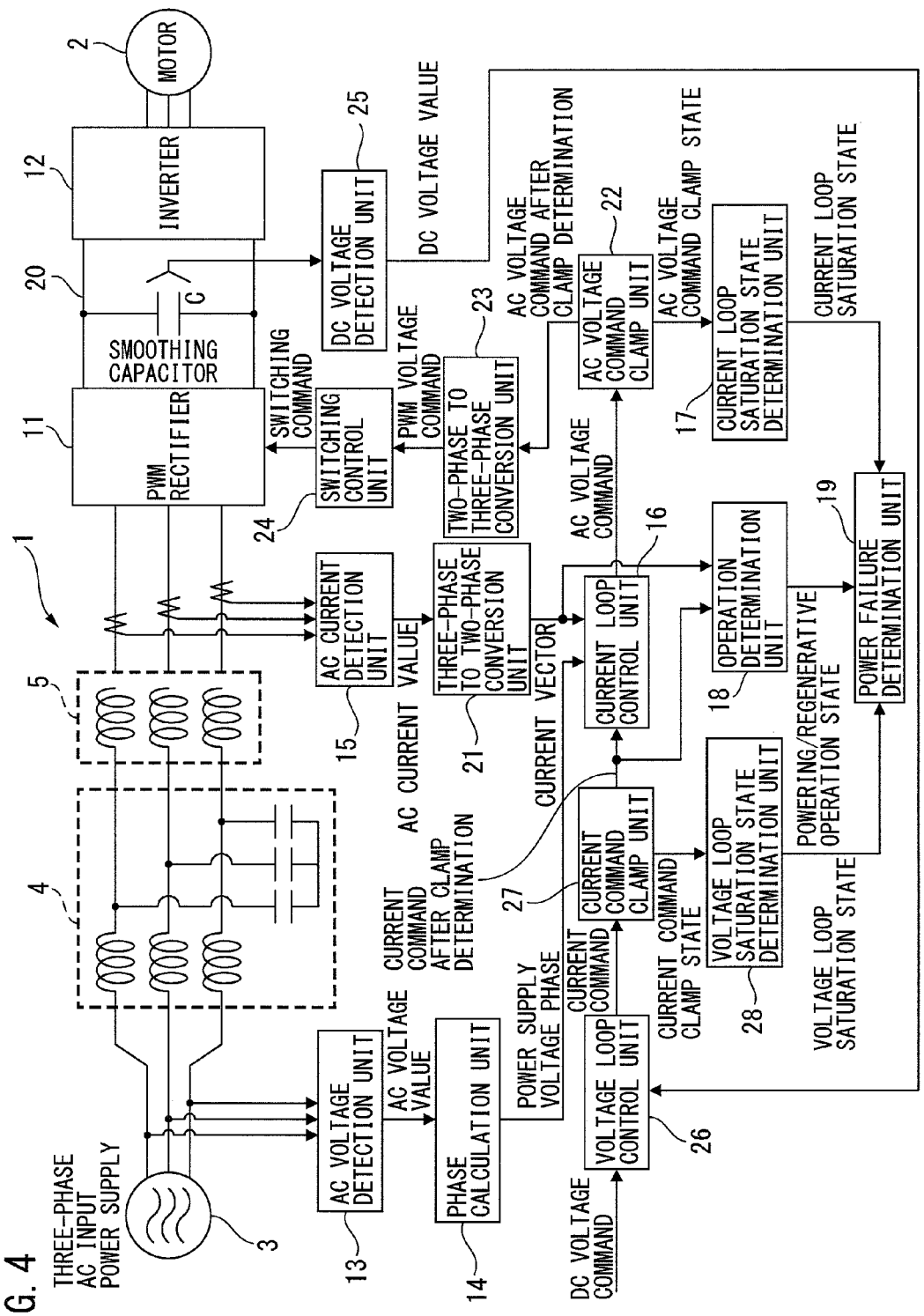
FIG. 4 is a principle block diagram illustrating a motor control apparatus according to a second embodiment.
Figure 5:
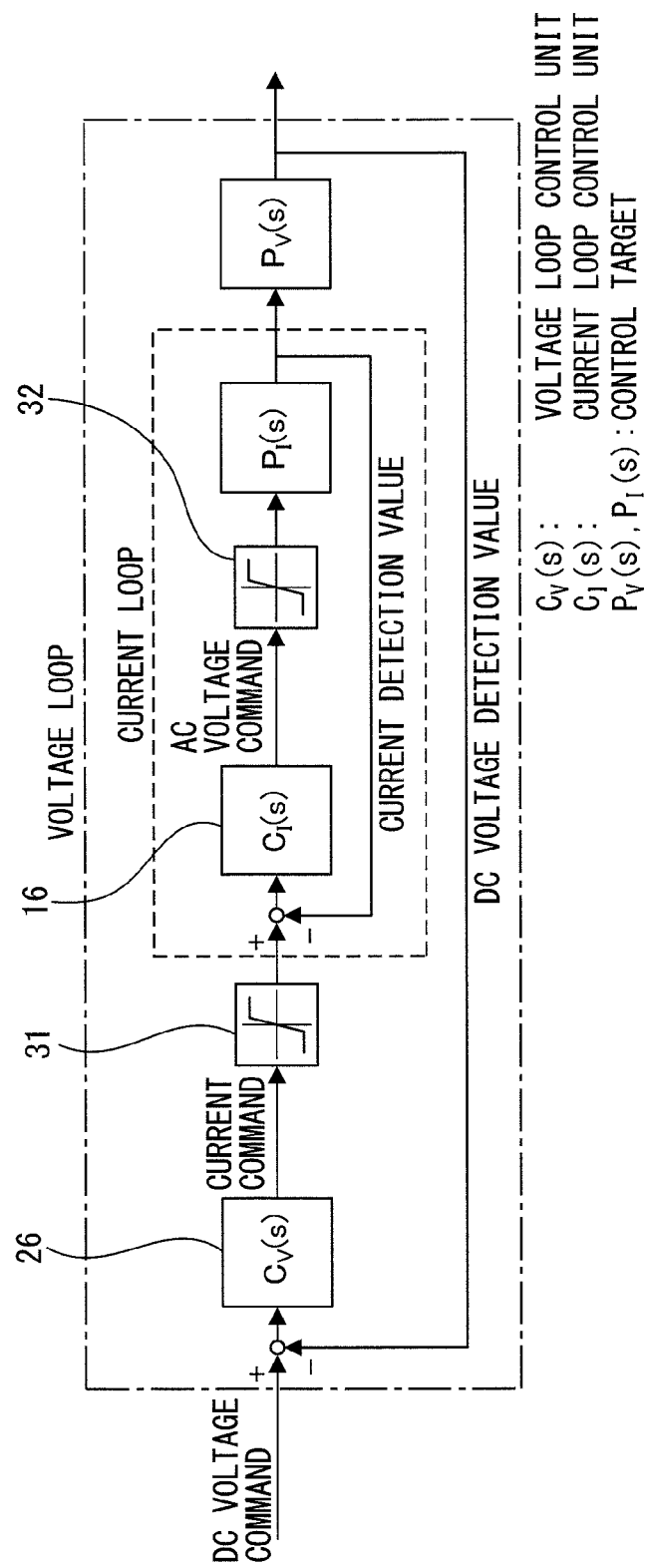
FIG. 5 is a control block diagram of a PWM rectifier.

FIG. 4 is a principle block diagram of a motor control apparatus according to a second embodiment. The second embodiment is implemented by adding a voltage control loop to the motor control apparatus 1 in the first embodiment of FIG. 1. FIG. 5 is a control block diagram of the PWM rectifier.

As depicted in FIG. 5, a control system of the PWM rectifier generally consists of a voltage loop control unit 26 and a current loop control unit 16. The voltage loop control unit 26 generates a current command from an error between an input DC voltage command and a DC voltage value of a smoothing capacitor C provided at the DC link 20. In FIG. 5, a transfer function of the voltage loop control unit 26 is assumed to be $C_v(S)$. A magnitude of the current command generated by the voltage loop control unit 26 has an upper limit value which is determined according to rated currents of semiconductor switching elements and the like in the PWM rectifier 11 and the current command is clamped when it is equal to or larger than the upper limit value (reference numeral 31). Here, a state in which the current command is clamped is referred to as the "voltage loop saturation state". The current loop control unit 16 generates an AC voltage command for controlling a power conversion operation of the PWM rectifier based on an error between the input current command and the AC current value, and a power supply voltage phase. In FIG. 5, a transfer function of the current loop control unit 16 is assumed to be $C_I(S)$. As described above in the aforementioned first embodiment, the magnitude of the AC voltage command generated by the current loop control unit 16 has the upper limit value determined according to the rated currents of the semiconductor switching elements and the like in the PWM rectifier 11 and the AC voltage command is clamped when it is equal to or larger than the upper limit value (reference numeral 32). In FIG. 5, transfer functions $P_I(S)$ and $P_V(S)$ represent control targets.

In a second embodiment, in addition to the determination results of the operation determination unit 18 and the current loop saturation state determination unit 17 used in the aforementioned first embodiment, the voltage loop saturation state is further used for determining a presence or absence of a power failure at the AC power supply side. In other words, according to the second embodiment, in addition to components in the motor control apparatus 1 according to the first embodiment described with reference to FIG. 1, a DC voltage detection unit 25, a voltage loop control unit 26, a current command clamp unit 27, and a voltage loop saturation state determination unit 28 are included.

The DC voltage detection unit 25 detects a DC voltage value at the DC link 20 (i.e., a DC voltage value of the smoothing capacitor). The DC voltage value detected by the DC voltage detection unit 25 is transmitted to the voltage loop control unit 26.

The voltage loop control unit 26 generates a current command based on an error between the input DC voltage command and the DC voltage value detected by the DC voltage detection unit 25.

The current command clamp unit 27 first calculates a magnitude of the current command generated by the voltage loop control unit 26. As the magnitude of the current command, the vector norm on the two-phase coordinate described with reference to FIG. 3B is calculated, for example. In general, the magnitude of the current command has an upper limit value determined according to the rated currents of the semiconductor switching elements and the like in the PWM rectifier 11. When the magnitude of the current command calculated by the current command clamp unit 27 is equal to or larger than the upper limit value, the current command generated by the voltage loop control unit 26 is clamped at the upper limit value. The clamped current command is transmitted to the current loop control unit 16. Hereinafter, the current command being transmitted to the current loop control unit 16 from the current command clamp unit 27 is referred to as the "current command after clamp determination". As described with reference to FIG. 5, a state in which the current command is clamped is referred to as the "voltage loop saturation state". When the current command is clamped by the current command clamp unit 27, the voltage loop saturation state determination unit 28 is notified of that effect. Note that when the magnitude of the current command calculated by the current command clamp unit 27 is less than the upper limit value, the current command generated by the voltage loop control unit 26 is transmitted as is to the current loop control unit 16 as the "current command after clamp determination".

When the current command is clamped by the current clamp unit 27, i.e., when the magnitude of the current command is equal to or larger than a predetermined upper limit value, the voltage loop saturation state determination unit 28 determines to be in the voltage loop saturation state and notifies the power failure determination unit 19 of that effect.

In the second embodiment, the power failure determination unit 19 determines that a power failure has occurred at the AC power supply side of the PWM rectifier 11 by using the first requirement that the operation determination unit 18 determines to be in the regenerative operation state, the second requirement that the current loop saturation state determination unit 17 determines to be in the current loop saturation state, and a third requirement that the voltage loop saturation state determination unit 28 determines to be in the voltage loop saturation state. In other words, the power failure determination unit 19 determines that a power failure has occurred at the AC power supply side of the PWM rectifier 11 when the operation determination unit 18 determines to be in the regenerative operation state (the first requirement), the current loop saturation state determination unit 17 determines to be in the current loop saturation state (the second requirement), and the voltage loop saturation state determination unit 28 determines to be in the voltage loop saturation state (the third requirement). Since the PWM rectifier is unable to flow current as instructed by the switching command when a power failure has occurred while the PWM rectifier 11 is in the regenerative operation, the error between the current command and the current vector obtained by the three-phase to two-phase conversion on the AC current value by the three-phase to two-phase conversion unit 21 is large and the AC voltage command which is output by the current loop control unit 16 becomes large. When the magnitude of the AC voltage command is equal to or larger than the predetermined upper limit value, the AC voltage command generated by the current loop control unit 16 is clamped by the AC voltage command clamp unit 22 and the current loop saturation state determination unit 17 determines to be in the current loop saturation state. As a result that the PWM rectifier is unable to flow current as instructed by the switching command, the DC voltage at the DC link 20 at the DC side of the PWM rectifier 11 increases, the error between the DC voltage command and the DC voltage value detected by the DC voltage detection unit 25 is large, and the current command which is output by the voltage loop control unit 26 is large. When the magnitude of the current command is equal to or larger than the upper limit value, the current command generated by the voltage loop control unit 26 is clamped by the current command clamp unit 27 and the voltage loop saturation state determination unit 28 determines to be in the voltage loop saturation state. Thus, the power failure determination unit 19 in the second embodiment determines that a power failure has occurred at the AC power supply side when the first requirement, the second requirement, and the third requirement are all met. Thereby, in a motor control apparatus including: a PWM rectifier for rectifying AC power supplied from an AC power supply side provided with a three-phase AC input power supply to output DC power; and an inverter, being connected to a DC link at a DC side of the PWM rectifier, for performing a bidirectional power conversion between DC power at the DC link and AC power which is drive power for a motor or regenerative power, it is possible to more accurately detect a power failure when the power failure has occurred in which the AC power supply side is an open state while the PWM rectifier is in a regenerative operation.

Note that the same circuit components are denoted by the same numerals and detailed description of the circuit components are omitted, since circuit components other than those described above are similar to circuit components illustrated in FIG. 1.

Figure 6:
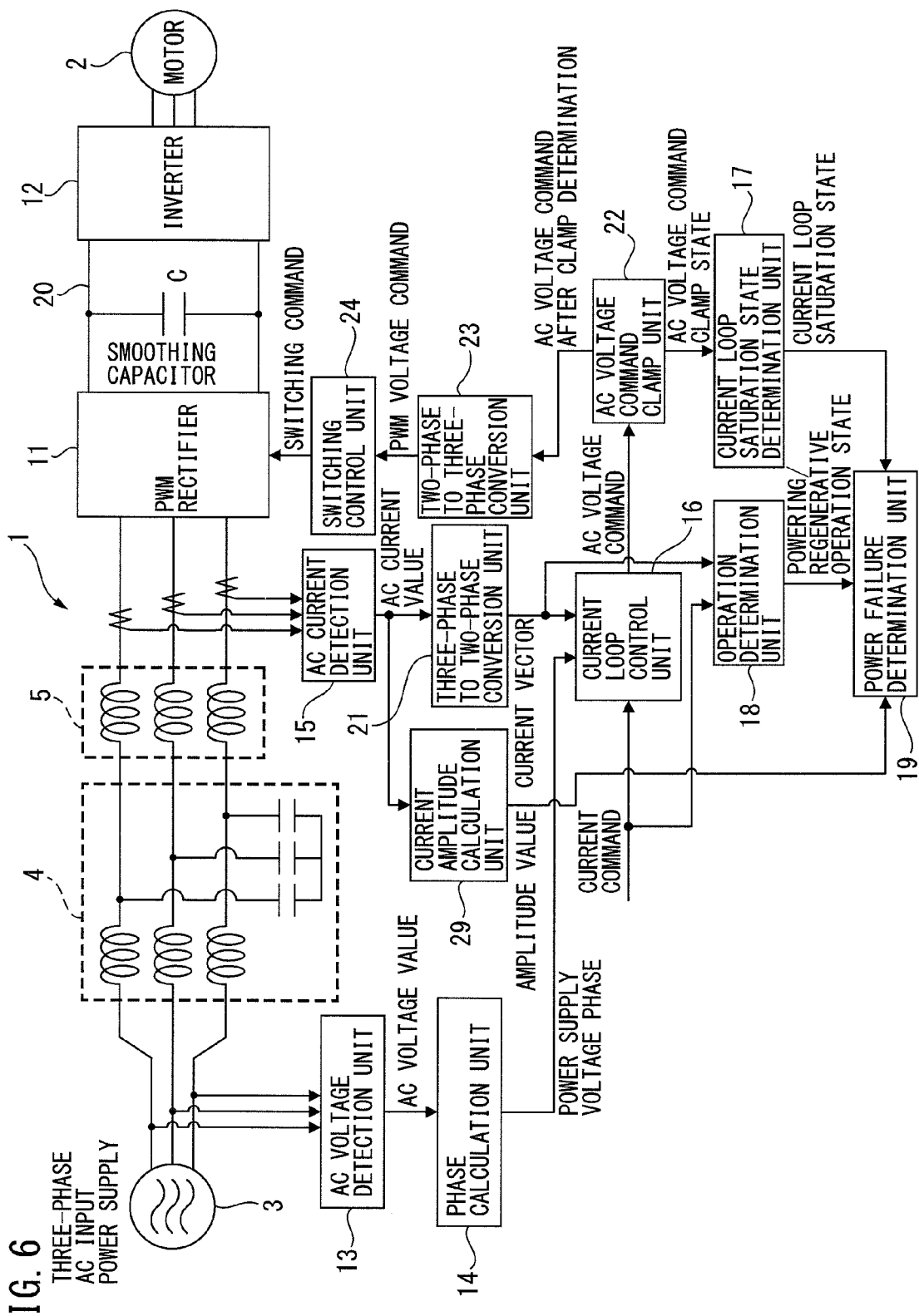
FIG. 6 is a principle block diagram illustrating a motor control apparatus according to a third embodiment.

FIG. 6 is a principle block diagram of a motor control apparatus according to a third embodiment. In the aforementioned first embodiment, the power failure determination unit 19 determines that a power failure has occurred at the AC power supply side of the PWM rectifier 11 when the operation determination unit 18 determines to be in the regenerative operation state and the current loop saturation state determination unit 17 determines to be in the current loop saturation state. However, in the first embodiment, since a current equal to or larger than the rated currents of the semiconductor switching elements is forced to flow when power regenerated by the PWM rectifier 11 is excessive during a regenerative operation even in a case that no power failure has occurred at the AC power supply side, the AC voltage command results in being clamped at the upper limit value, and thereby, it is possible to determine if a power failure has occurred at the AC power supply side due to a determination by the current loop saturation state determination unit 17 of being in the current loop saturation state. Thus, in the third embodiment, by using a phenomenon that no current flows when a power failure occurs during a regenerative operation, a current amplitude at the AC power supply side of the PWM rectifier 11 is used for determining a presence and absence of a power failure at the AC power supply side, in addition to the determination result of the operation determination unit 18 and the determination result of the current loop saturation state determination unit 17 used in the aforementioned first embodiment.

According to the third embodiment, as illustrated in FIG. 6, a current amplitude calculation unit 29 for calculating a current amplitude value from an AC current value detected by the AC current detection unit 15 is further included, in addition to the circuit components in the motor control apparatus 1 according to the first embodiment as described with reference to FIG. 1. Calculation methods of a current amplitude value by the current amplitude calculation unit 29 include, for example, a method for calculating a current vector norm obtained by a three-phase to two-phase conversion on an AC current value detected by the AC current detection unit 15, a method for calculating a peak value of AC current values detected by the AC current detection unit 15, and the like.

In the third embodiment, the power failure determination unit 19 determines that a power failure has occurred at the AC power supply side of the PWM rectifier 11 by using the first requirement that the operation determination unit 18 determines to be in the regenerative operation state, the second requirement that the current loop saturation state determination unit 17 determines to be in the current loop saturation state, and a fourth requirement that a current amplitude value calculated by the current amplitude calculation unit 29 is equal to or less than a predetermined amplitude value. In other words, the power failure determination unit 19 determines that a power failure has occurred at the AC power supply side of the PWM rectifier 11 when the operation determination unit 18 determines to be in the regenerative operation state (the first requirement), the current loop saturation state determination unit 17 determines to be in the current loop saturation state (the second requirement), and a current amplitude value calculated by the current amplitude calculation unit 29 is equal to or less than a predetermined amplitude value (the fourth requirement). The "predetermined amplitude value" may be set to a value, for example, near zero. When a power failure has occurred in which the AC power supply side becomes the open state while the PWM rectifier 11 is in the regenerative operation, no AC current flows in the AC power supply side of the PWM rectifier 11. Thus, the power failure determination unit 19 in the third embodiment determines that a power failure has occurred at the AC power supply side when the first requirement, the second requirement, and the fourth requirement are all met. Thereby, in a motor control apparatus including: a PWM rectifier for rectifying AC power supplied from an AC power supply side provided with a three-phase AC input power supply to output DC power; and an inverter, being connected to a DC link at a DC side of the PWM rectifier, for performing a bidirectional power conversion between DC power at the DC link and AC power which is drive power for a motor or regenerative power, it is possible to eliminate an erroneous determination that a power failure has occurred at the AC power supply side when power regenerated by the PWM rectifier becomes excessive, thereby makes it possible to even more accurately detect a power failure in which the AC power supply side is an open state while the PWM rectifier is in the regenerative operation.

Note that the same circuit components are denoted by the same numerals and detailed description of the circuit components are omitted, since circuit components other than those described above are similar to circuit components illustrated in FIG. 1.

Figure 7:
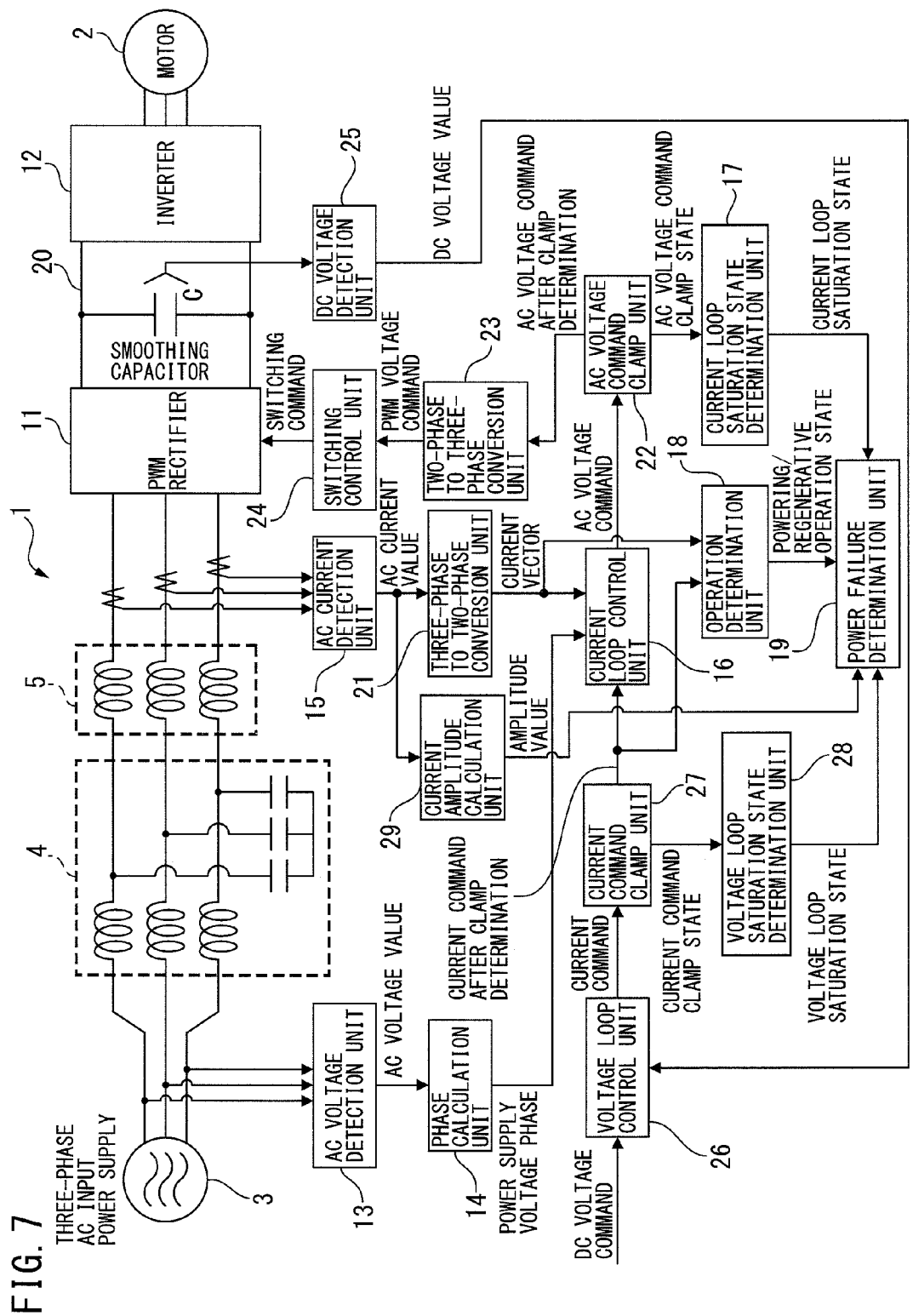
FIG. 7 is a principle block diagram illustrating a motor control apparatus according to a fourth embodiment.

FIG. 7 is a principle block diagram of a motor control apparatus according to a fourth embodiment. In the aforementioned second embodiment, the power failure determination unit 19 determines that a power failure has occurred at the AC power supply side of the PWM rectifier 11 when the operation determination unit 18 determines to be in the regenerative operation state (the first requirement), the current loop saturation state determination unit 17 determines to be in the current loop saturation state (the second requirement), and the voltage loop saturation state determination unit 28 determines to be in the voltage loop saturation state (the third requirement). However, in the second embodiment, in a similar way as in the first embodiment, it will lead to an erroneous determination that a power failure has occurred at the AC power supply side even when no power failure has occurred at the AC power supply side during a regenerative operation since the current loop saturation state determination unit 17 results in determining to be in the current loop saturation state in a case that power regenerated by the PWM rectifier is being excessive. Thus, in the fourth embodiment, by using a phenomenon that no current flows when a power failure has occurred during a regenerative operation, the current amplitude value at the AC power supply side of the PWM rectifier 11 is used for determining a presence or absence of a power failure at the AC power supply side, in addition to the determination results of the operation determination unit 18, the current loop saturation state determination unit 17, and the voltage loop saturation determination unit 28 used in the aforementioned second embodiment.

According to the fourth embodiment, as illustrated in FIG. 7, a current amplitude calculation unit 29 for calculating a current amplitude value from an AC current value detected by the AC current detection unit 15 is further included in addition to the circuit elements in the motor control apparatus 1 according to the second embodiment described with reference to FIG. 4. Calculation methods of the current amplitude value by the current amplitude calculation unit 29 include, for example, a method for calculating a current vector norm obtained by a three-phase to two-phase conversion on an AC current value detected by the AC current detection unit 15, a method for calculating a peak value of AC current values detected by the AC current detection unit 15, and the like.

In the fourth embodiment, the power failure determination unit 19 determines that a power failure has occurred at the AC power supply side of the PWM rectifier 11 by using the first requirement that the operation determination unit 18 determines to be in the regenerative operation state, the second requirement that the current loop saturation state determination unit 17 determines to be in the current loop saturation state, the third requirement that the voltage loop saturation state determination unit 28 determines to be in the voltage loop saturation state, and the fourth requirement that a current amplitude value calculated by the current amplitude calculation unit 29 is equal to or less than a predetermined amplitude value. In other words, the power failure determination unit 19 determines that a power failure has occurred at the AC power supply side of the PWM rectifier 11 when the operation determination unit 18 determines to be in the regenerative operation state (the first requirement), the current loop saturation state determination unit 17 determines to be in the current loop saturation state (the second requirement), the voltage loop saturation state determination unit 28 determines to be in the voltage loop saturation state (the third requirement), and the current amplitude value calculated by the current amplitude calculation unit 29 is equal to or less than the predetermined amplitude value (the fourth requirement). The "predetermined amplitude value" may be set to a value, for example, near zero. When a power failure has occurred, in which the AC power supply side becomes the open state while the PWM rectifier 11 is in the regenerative operation, no AC current flows in the AC power supply side of the PWM rectifier 11. Thus, the power failure determination unit 19 in the fourth embodiment determines that a power failure has occurred at the AC power supply side when the first requirement, the second requirement, the third requirement, and the fourth requirement are all met. Thereby, in a motor control apparatus including: a PWM rectifier for rectifying AC power supplied from an AC power supply side provided with a three-phase AC input power supply to output DC power; and an inverter, being connected to a DC link at a DC side of the PWM rectifier, for performing a bidirectional power conversion between DC power at the DC link and AC power which is drive power for a motor or regenerative power, it is possible to eliminate an erroneous determination that a power failure has occurred at the AC power supply side when power regenerated by the PWM rectifier becomes excessive, thus makes it possible to even more accurately detect a power failure in which the AC power supply side becomes an open state while the PWM rectifier is in a regenerative operation, d.

Note that the same circuit components are denoted by the same numerals and detailed description of the circuit components are omitted, since circuit components other than those described above are similar to circuit components illustrated in FIG. 4.

Figure 8:
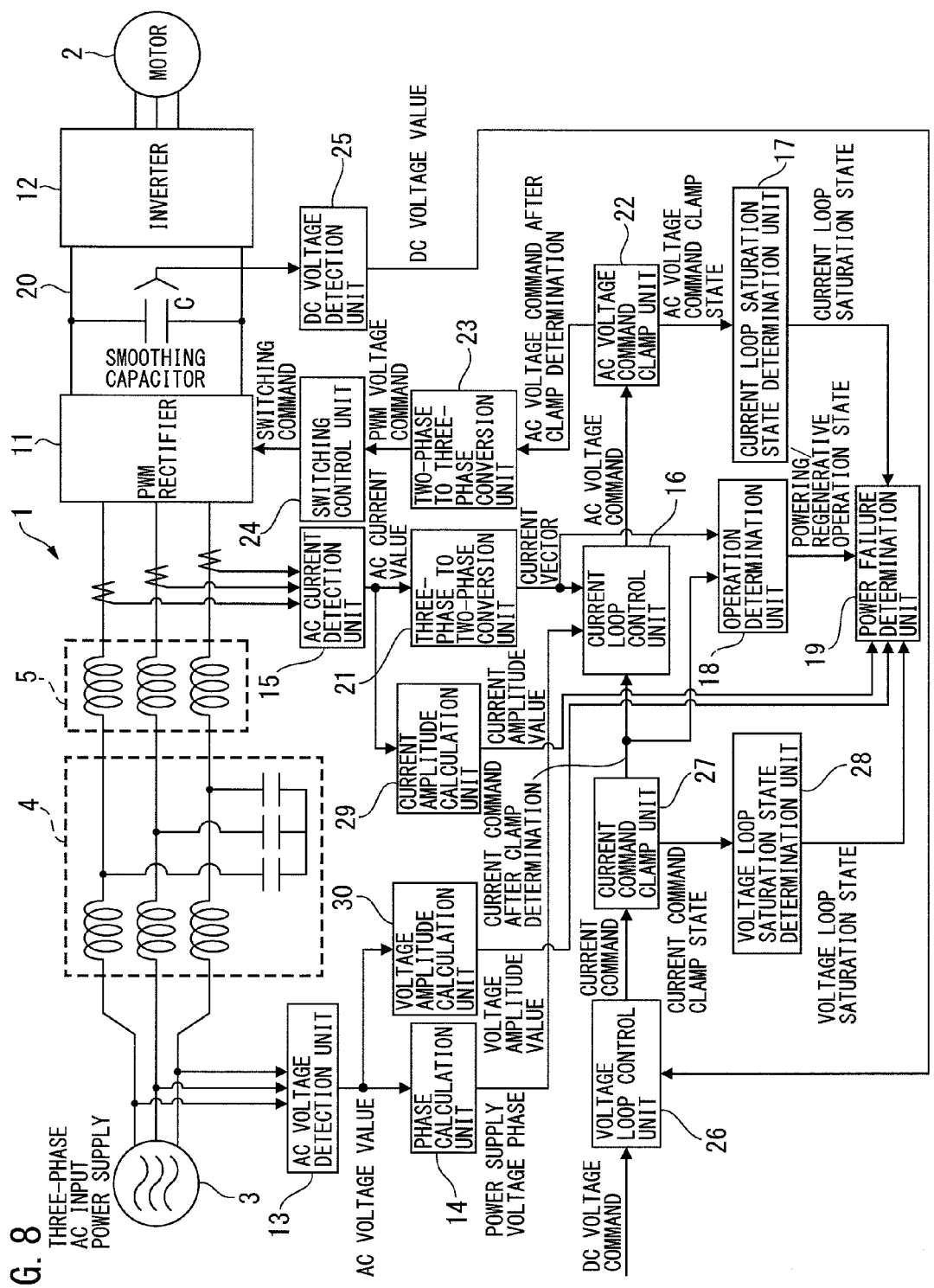
FIG. 8 is a principle block diagram illustrating a motor control apparatus according to a fifth embodiment.
Figure 9:
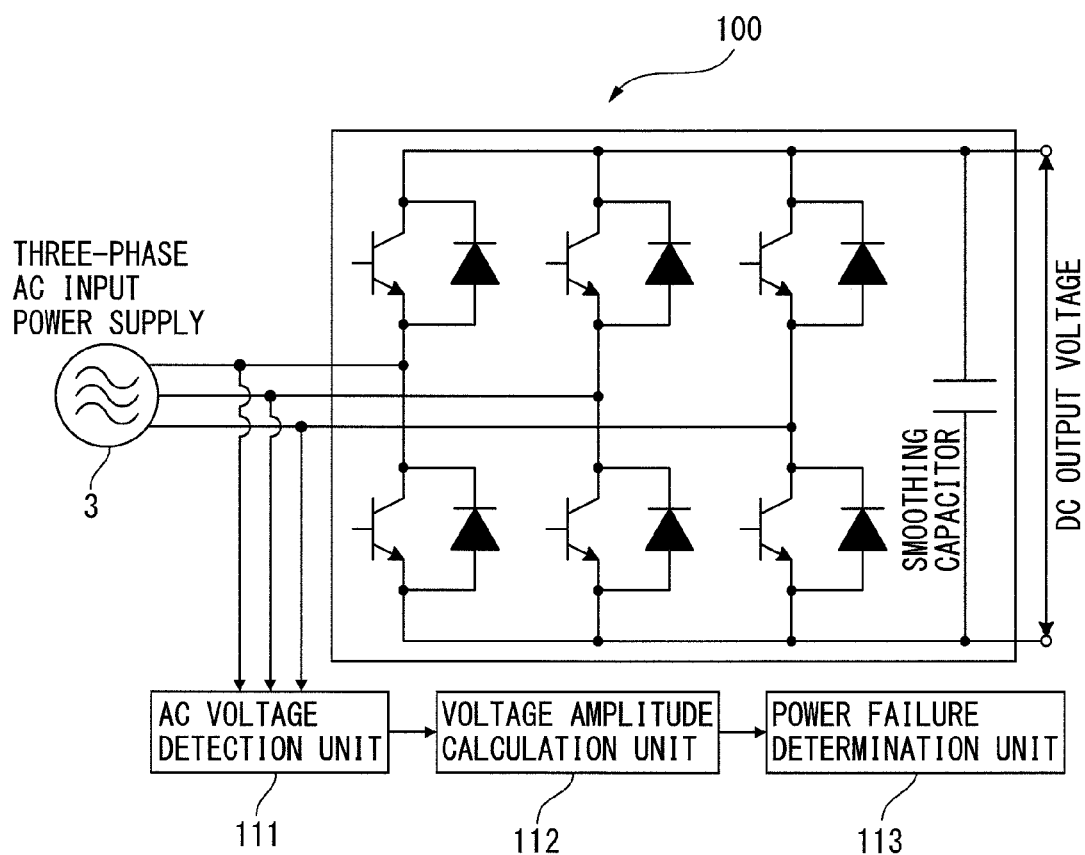
FIG. 9 is a diagram illustrating a power failure detection method according to the invention described in Japanese Laid-open Patent Publication No; 2006-14546.
Figure 10:
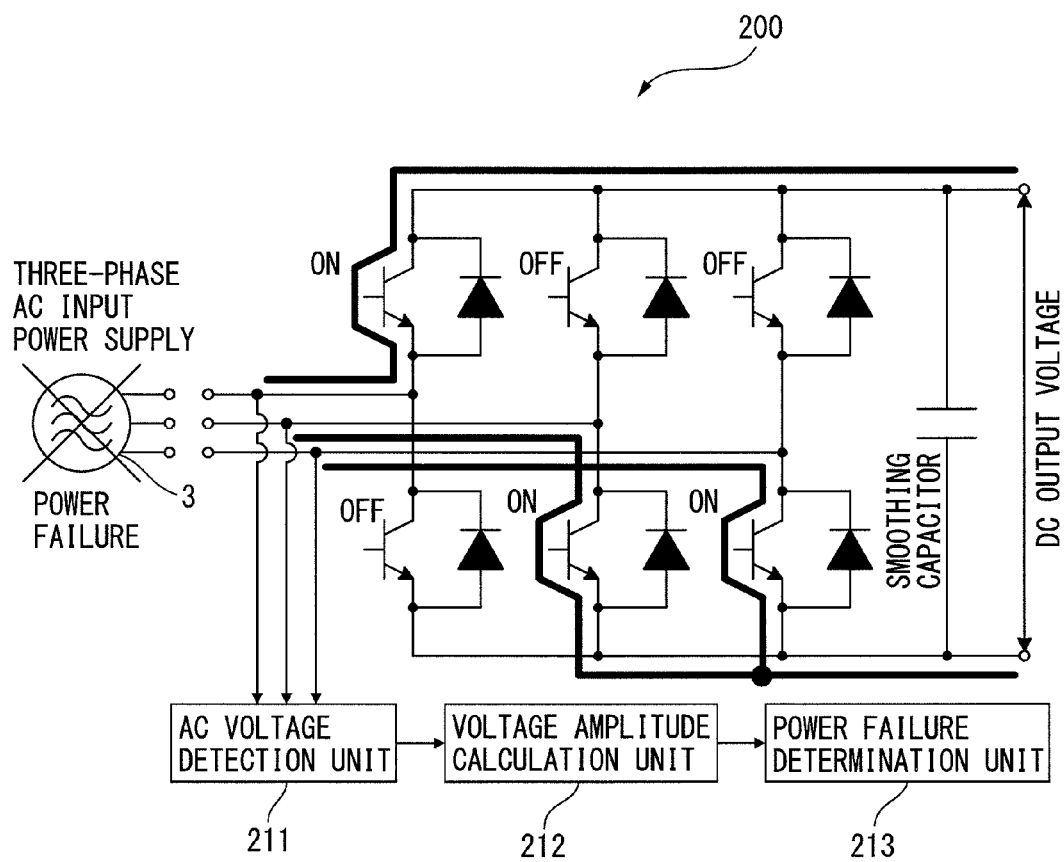
FIG. 10 is a diagram illustrating a power failure detection at an AC power supply side of the PWM rectifier during a regenerative operation in which a DC output voltage does not decrease, in a motor control apparatus with a conventional PWM rectifier and inverter.

FIG. 8 is a principle block diagram of a motor control apparatus according to a fifth embodiment. In the fifth embodiment, it is determined that a power failure has occurred at the AC power supply side of the PWM rectifier 11 even when a voltage amplitude value at the AC power supply side of the PWM rectifier 11 is equal to or less than a predetermined amplitude value in the first to fourth embodiment described above. As an example, a motor control apparatus further including a voltage amplitude calculation unit 30 in addition to the circuit components in the motor control apparatus 1 according to the fourth embodiment described with reference to FIG. 7 will be described.

The voltage amplitude calculation unit 30 calculates a voltage amplitude value from an AC voltage value detected by the AC voltage detection unit 13. Calculation methods of a voltage amplitude value by the voltage amplitude calculation unit 30 include, for example, a method for calculating a voltage vector norm obtained by a three-phase to two-phase conversion on an AC voltage value detected by the AC voltage detection unit 13, a method for calculating a peak value of AC voltage values detected by the AC voltage detection unit 13, and the like. The calculated voltage amplitude value is transmitted to the power failure determination unit 19.

In the fifth embodiment, when the voltage amplitude value calculated by the voltage amplitude calculation unit 30 is equal to or less than a predetermined amplitude value, the power failure determination unit 19 determines that a power failure has occurred at the AC power supply side of the PWM rectifier 11. In other words, in this case, a power failure occurred at the AC power supply side is detected when the PWM rectifier is in the powering operation state or in a no-load operation state. Furthermore, a power failure in which the AC power supply side is not the open state while the PWM rectifier 11 is in the regenerative operation can also be detected. On the other hand, the power failure determination unit 19 determines that a power failure has occurred at the AC power supply side of the PWM rectifier 11 when the operation determination unit 18 determines to be in the regenerative operation state (the first requirement), the current loop saturation state determination unit 17 determines to be in the current loop saturation state (the second requirement), the voltage loop saturation state determination unit 28 determines to be in the voltage loop saturation state (the third requirement), and a current amplitude value calculated by the current amplitude calculation unit 29 is equal to or less than a predetermined amplitude value (the fourth requirement). In other words, in this case, a power failure in which the AC power supply side is the open state is detected when the PWM rectifier 11 is in the regenerative operation state. Therefore, according to the fifth embodiment, a power failure at the AC power supply side can be detected even when the PWM rectifier is in any of the powering operation state, no-load operation state, or regenerative operation state.

Note that the same circuit components are denoted by the same numerals and detailed description of the circuit components are omitted, since circuit components other than those described above are similar to circuit components illustrated in FIG. 7.

The present invention can be applied to determine a presence or absence of an occurrence of a power failure at an AC power supply side of a PWM rectifier power supply as a motor control apparatus for driving motors in machine tools, forming machines, injection molding machines, industrial machines, or various kinds of robots. The motor control apparatus includes a PWM rectifier for converting input AC power to DC power and an inverter for converting the DC power output from the PWM rectifier to AC power respectively supplied as drive power for each motor.

According to the present invention, in a motor control apparatus including: a PWM rectifier for rectifying AC power supplied from a three-phase AC input power supply to output DC power; and an inverter, being connected to a DC link at a DC side of the PWM rectifier, for performing a bidirectional power conversion between DC power at the DC link and AC power which is drive power for a motor or regenerative power, it is possible to accurately detect a power failure when the power failure in which an AC power supply side is an open state while the PWM rectifier is in a regenerative operation has occurred. If an occurrence of a power failure at the AC power supply side of the PWM rectifier can be accurately detected, various protective operations to protect a motor driven by the motor control apparatus, a tool connected to the motor, a processing target to be processed by the tool, a manufacturing line with the motor control apparatus, and the like can be reliably performed, and thereby safety is improved.

Since the power failure determination unit according to the first embodiment determines that a power failure has occurred at the AC power supply side of the PWM rectifier when the operation determination unit determines to be in the regenerative operation state and the current loop saturation state determination unit determines to be in the current loop saturation state, it is possible to accurately detect a power failure when the power failure has occurred in which the AC power supply side becomes the open state while the PWM rectifier is in the regenerative operation.

Since the power failure determination unit according to the second embodiment determines that a power failure has occurred at the AC power supply side of the PWM rectifier when the operation determination unit determines to be in the regenerative operation state, the current loop saturation state determination unit determines to be in the current loop saturation state, and the voltage loop saturation state determination unit determines to be in the voltage loop saturation state, it is possible to more accurately detect a power failure when the power failure occurs in which the AC power supply side becomes the open state while the PWM rectifier is in the regenerative operation.

Since the power failure determination unit according to the third embodiment determines that a power failure has occurred at the AC power supply side of the PWM rectifier when the operation determination unit determines to be in the regenerative operation state, the current loop saturation state determination unit determines to be in the current loop saturation state, and a current amplitude value calculated by the current amplitude calculation unit is equal to or less than the predetermined amplitude value, it is possible to eliminate an erroneous determination that a power failure has occurred at the AC power supply side when power regenerated by the PWM rectifier becomes excessive, thus makes it possible to even more accurately detect a power failure in which the AC power supply side is the open state while the PWM rectifier is in the regenerative operation.

Since the power failure determination unit according to the fourth embodiment determines that a power failure has occurred at the AC power supply side of the PWM rectifier when the operation determination unit determines to be in the regenerative operation state, the current loop saturation state determination unit determines to be in the current loop saturation state, the voltage loop saturation state determination unit determines to be in the voltage loop saturation state, and a current amplitude value calculated by the current amplitude calculation unit is equal to or less than the predetermined amplitude value, it is possible to eliminate an erroneous determination that a power failure has occurred at the AC power supply side when power regenerated by the PWM rectifier is excessive, thus makes it possible to even more accurately detect a power failure in which the AC power supply side is the open state while the PWM rectifier is in the regenerative operation.

The power failure determination unit according to the fifth embodiment determines that a power failure has occurred at the AC power supply side of the PWM rectifier also when the voltage amplitude value at the AC power supply side is equal to or less than the predetermined amplitude value, in addition to power failure determinations according to the first to fourth embodiments described above. Accordingly, a power failure at the AC power supply side can be detected even when the PWM rectifier is in any of the powering operation, no-load operation, or regenerative operation states.

The invention claimed is:

1. A motor control apparatus comprising:
  a PWM rectifier for performing a bidirectional power conversion between AC power at an AC power supply side and DC power at a DC link being on a DC side;
  an inverter for performing a bidirectional power conversion between DC power at the DC link and AC power being drive power for a motor or regenerative power, the inverter being connected to the DC link;
  an AC voltage detection unit for detecting an AC voltage value at the AC power supply side of the PWM rectifier;
  a phase calculation unit for calculating a power supply voltage phase from the AC voltage value;
  an AC current detection unit for detecting an AC current value at the AC power supply side of the PWM rectifier;
  a current loop control unit for generating an AC voltage command to control a power conversion operation of the PWM rectifier based on an error between an input current command and the AC current value and the power supply voltage phase;
  a current loop saturation state determination unit for determining a current loop saturation state when a magnitude of the AC voltage command is equal to or larger than a predetermined voltage prescribed value;
  an operation determination unit for determining whether the PWM rectifier is in a powering operation state in which AC power is converted to DC power or in a regenerative operation state in which DC power is converted to AC power;
  a power failure determination unit for determining a presence or absence of a power failure at the AC power supply side of the PWM rectifier by using determination results of the operation determination unit and the current loop saturation state determination unit;
  a DC voltage detection unit for detecting a DC voltage value at the DC link;
  a voltage loop control unit for generating the current command to be input to the current loop control unit based on an error between an input DC voltage command and the DC voltage value; and
  a voltage loop saturation state determination unit for determining to be in a voltage loop saturation state when a magnitude of the current command is equal to or larger than a predetermined current prescribed value,
  wherein the power failure determination unit determines that a power failure occurs at the AC power supply side of the PWM rectifier by using a first requirement that the operation determination unit determines to be in the regenerative operation, a second requirement that the current loop saturation state determination unit determines to be in the current loop saturation state and a third requirement that the voltage loop saturation state determination unit determines to be in the voltage loop saturation state.

2. The motor control apparatus according to claim 1, further comprising a current amplitude calculation unit for calculating a current amplitude value from the AC current value,
  wherein the power failure determination unit determines that a power failure is occurred at the AC power supply side of the PWM rectifier by using the first requirement, the second requirement, the third requirement, and a fourth requirement that the current amplitude value is equal to or less than a predetermined amplitude value.

3. A motor control apparatus comprising:
  a PWM rectifier for performing a bidirectional power conversion between AC power at an AC power supply side and DC power at a DC link being on a DC side;
  an inverter for performing a bidirectional power conversion between DC power at the DC link and AC power being drive power for a motor or regenerative power, the inverter being connected to the DC link;
  an AC voltage detection unit for detecting an AC voltage value at the AC power supply side of the PWM rectifier;
  a phase calculation unit for calculating a power supply voltage phase from the AC voltage value;
  an AC current detection unit for detecting an AC current value at the AC power supply side of the PWM rectifier;
  a current loop control unit for generating an AC voltage command to control a power conversion operation of the PWM rectifier based on an error between an input current command and the AC current value and the power supply voltage phase;
  a current loop saturation state determination unit for determining a current loop saturation state when a magnitude of the AC voltage command is equal to or larger than a predetermined voltage prescribed value;
  an operation determination unit for determining whether the PWM rectifier is in a powering operation state in which AC power is converted to DC power or in a regenerative operation state in which DC power is converted to AC power;
  a power failure determination unit for determining a presence or absence of a power failure at the AC power supply side of the PWM rectifier by using determination results of the operation determination unit and the current loop saturation state determination unit; and
  a current amplitude calculation unit for calculating a current amplitude value from the AC current value,
  wherein the power failure determination unit determines that a power failure is occurred at the AC power supply side of the PWM rectifier by using a first requirement that the operation determination unit determines to be in the regenerative operation, a second requirement that the current loop saturation state determination unit determines to be in the current loop saturation state and a fourth requirement that the current amplitude value is equal to or less than a predetermined amplitude value.

4. The motor control apparatus according to claim 1, further comprising a voltage amplitude calculation unit for calculating a voltage amplitude value from the AC voltage value, wherein the power failure determination unit determines that a power failure is occurred at the AC power supply side of the PWM rectifier also when the voltage amplitude value is equal to or less than a predetermined amplitude value.

5. The motor control apparatus according to claim 2, further comprising a voltage amplitude calculation unit for calculating a voltage amplitude value from the AC voltage value, wherein the power failure determination unit determines that a power failure is occurred at the AC power supply side of the PWM rectifier also when the voltage amplitude value is equal to or less than a predetermined amplitude value.

6. The motor control apparatus according to claim 3, further comprising a voltage amplitude calculation unit for calculating a voltage amplitude value from the AC voltage value, wherein the power failure determination unit determines that a power failure is occurred at the AC power supply side of the PWM rectifier also when the voltage amplitude value is equal to or less than a predetermined amplitude value.

* * * * *